United States Patent [19]
Neff et al.

[11] Patent Number: 5,825,550
[45] Date of Patent: Oct. 20, 1998

[54] DEVICE FOR PROTECTING AN OPTICAL COMPONENT FROM LASER BEAM DAMAGE

[75] Inventors: Helmut Neff, Hermannsburg; Dieter Langhans, Elmshorn, both of Germany

[73] Assignee: TZN-Forschungs-und Entwicklungszentrum Unterlüss GmbH, Unterlüss, Germany

[21] Appl. No.: 782,631

[22] Filed: Jan. 10, 1997

[30] Foreign Application Priority Data

Jan. 10, 1996 [DE] Germany .................. 196 00 590.6

[51] Int. Cl.⁶ .................... G02B 27/00; G02B 5/20
[52] U.S. Cl. .................... 359/614; 359/601; 359/361
[58] Field of Search .................. 359/350–361, 359/589, 601–615, 885, 241–243; 351/213; 219/121.64, 121.63; 372/34, 57, 59, 98, 103, 109

[56] References Cited

U.S. PATENT DOCUMENTS

| 3,279,938 | 10/1966 | Schneeberger | 359/359 |
| 3,410,710 | 11/1968 | Mochel | 359/359 |
| 3,620,597 | 11/1971 | Schwartz et al. | 359/243 |
| 3,871,739 | 3/1975 | Poulsen | 359/360 |
| 3,982,206 | 9/1976 | Poulsen | 372/103 |
| 4,560,252 | 12/1985 | Mori | 359/359 |
| 4,650,287 | 3/1987 | Kudo et al. | 359/601 |
| 4,713,824 | 12/1987 | Heller | 372/99 |
| 4,920,257 | 4/1990 | Fuerthbauer et al. | 359/885 |
| 5,018,842 | 5/1991 | Chen | 399/241 |
| 5,519,522 | 5/1996 | Fergason | 359/359 |
| 5,608,567 | 3/1997 | Grupp | 359/614 |

FOREIGN PATENT DOCUMENTS 2 284 485  6/1995  United Kingdom .

*Primary Examiner*—Thong Nguyen
*Attorney, Agent, or Firm*—Spencer & Frank

[57] ABSTRACT

A device for protecting an optical component from a laser beam. The device includes a carrier which is light-pervious in a predetermined spectral range and is positionable in an expected path of a laser beam directed to the optical component; and a metal oxide film applied to the carrier. The film is light-pervious in the same spectral range and is oriented such as to intercept a laser beam directed to the optical component.

10 Claims, 1 Drawing Sheet

DEVICE FOR PROTECTING AN OPTICAL COMPONENT FROM LASER BEAM DAMAGE

CROSS REFERENCE TO RELATED APPLICATION

This application claims the priority of German Application No. 196 00 590.6 filed Jan. 10, 1996, which is incorporated herein by reference.

BACKGROUND OF THE INVENTION

This invention relates to a protective device associated with an optical component (such as an optical system or an optical element, for example, an optical lane) for preventing such component from being damaged when irradiated by a laser beam.

The use of laser beams in combat plays an ever-increasing role. Although at the present time the power of laser beams is still generally insufficient to penetrate and destroy armor, optical components, such as aiming systems or infrared instruments may be irreversibly damaged or fully destroyed by being blinded by intensive laser beam irradiation.

A simple protective device for an optical component may be constituted, for example, by a mechanical lock which, when impinged by a high-energy laser beam, does not allow the beam to enter the optical component. Such devices, however, are relatively inert because their shutoff times are at approximately 0.1 ms while the duration of the laser pulse may be in the range of a few µs.

SUMMARY OF THE INVENTION

It is an object of the invention to provide an improved device of the above-outlined type which is of simple construction and which effectively protects optical components against adverse effects of laser beam irradiation.

This object and others to become apparent as the specification progresses, are accomplished by the invention, according to which, briefly stated, the device for protecting an optical component from a laser beam includes a carrier which is light-pervious in a predetermined spectral range and is positionable in an expected path of a laser beam directed to the optical component; and a metal oxide film applied to the carrier. The metal oxide file is light-pervious in the same spectral range and is oriented much as to intercept a laser beam directed to the optical component.

In essence, the invention is based on the principle to utilize, as a protective device, a replaceable carrier which is light pervious in a predetermined spectral range and which carries a light pervious metal oxide film, preferably an oxide of a noble metal or a noble metal alloy, In case a high-energy laser beam impinges on the metal oxide layer, the latter heats up and, upon reaching a predetermined temperature, in reduced to metal which reflects the laser beam. Such a protective device in simple and economic to manufacture; it may be triggered automatically by the laser beam itself, thus making any electronic control unnecessary.

In order to obtain a uniformly reflecting surface upon impingement of a laser beam, however, it has been found to be advantageous to additionally heat the metal oxide film upon impingement of a laser beam by passing an electric current through the metal oxide film.

To be able to use the protective device primarily in the infrared ranges between 3 and 5 µm and 8 to 14 µm, which are of interest for military application, particularly gold oxide and platinum oxide have been found effective. The gold oxide is reduced to gold at about 150° C., while the platinum oxide is reduced to platinum at about 500° C. As materials for the carrier, particularly ZnS, ZnSe, KRS-5 or diamond have been found to be particularly useful. KRS-5 is a well known infrared transmitting window material and is composed of TlBRI (thallium bromide iodide).

DESCRIPTION OF THE PREFERRED EMBODIMENTS

Figure 1:
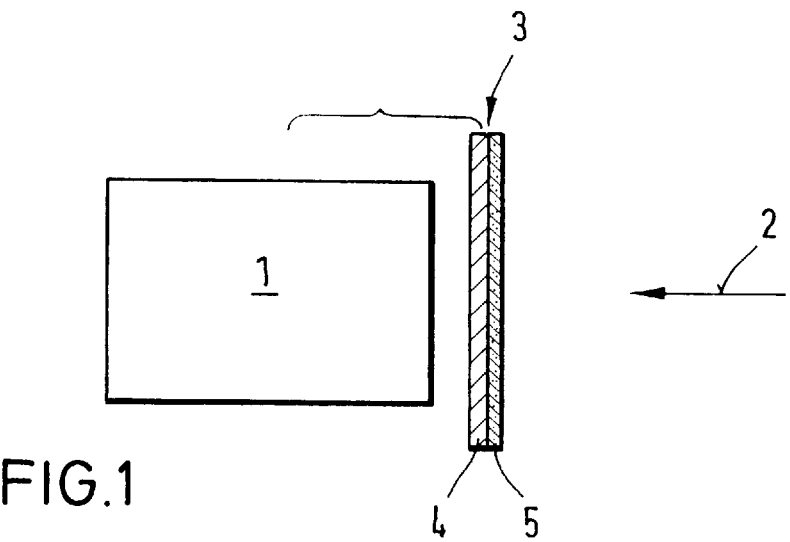
FIG. 1 is a schematic sectional view of a first preferred embodiments of the invention.

Turning to FIG. 1, an optical component 1, such as an optical system or optical structural element (for example, an entrance lens of an infrared aiming device) is to be protected from a laser beam 2. A protective device 3 according to the invention in arranged in front of the optical component 1, as viewed from the side of the incoming laser beam 2. The device essentially comprises a carrier 4, made, for example, of ZnS and a metal oxide film 5, for example, a platinum oxide film, applied to that side of the carrier 4 which is oriented away from the optical system 1. The carrier 4 and the metal oxide film 5 are light pervious in the wavelength range between 3 and 5 µm. A preferred thickness of the carrier would be around 1 mm, the thickness of the metal oxide films 5 around 1–3 µm.

If a high-energy laser beam 2 impinges on the metal oxide layer 5, the beam heats the metal oxide layer very rapidly to a temperature above 500° C. so that the oxide is reduced to metal and the metal reflects the laser beam and thus protects the optical component 1.

After use the protective device may be replaced. Such a replacement may be effected manually or by rotating a holding device (not shown) which supports a plurality of protective devices 3.

Figure 2:
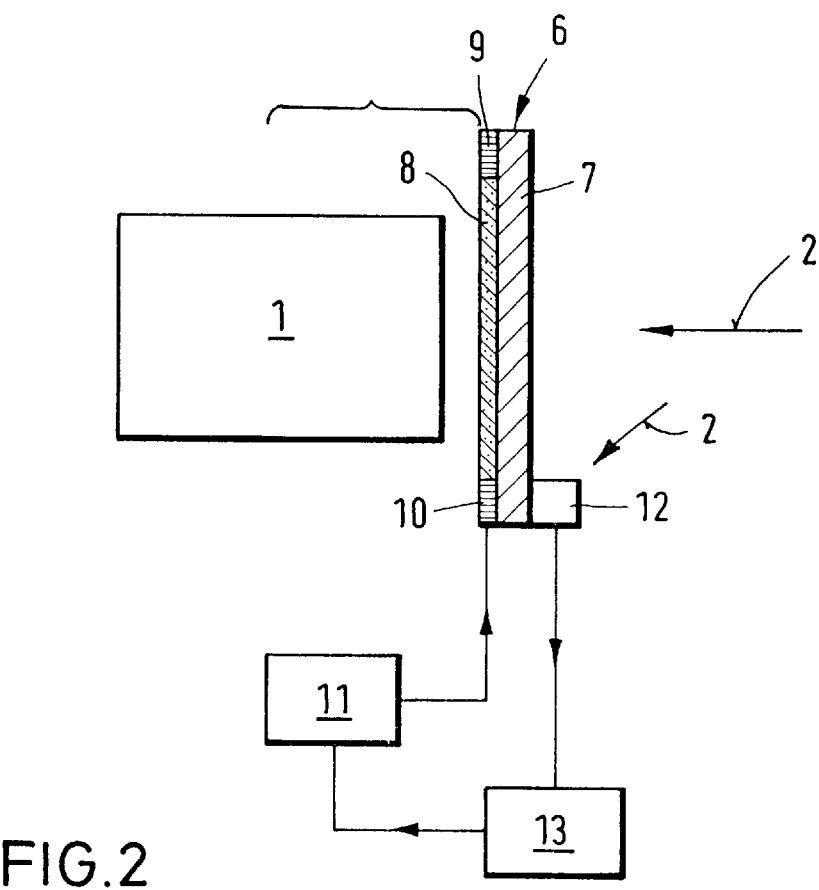
FIG. 2 is a schematic sectional view, with block diagram, of a second preferred embodiments of the invention.

FIG. 2 illustrates a second embodiment of the invention. The protective device generally designated at 6 has a carrier 7 provided with a metal oxide film 8 on that carrier face which is oriented towards the optical component 1 to be protected.

In edge regions the metal oxide film 8 is provided with electrodes 9 and 10 which are connected with a current source 11 so that an electric current may flow through the film 8 for example, by closing an electric circuit containing the current source 11 and the metal oxide film 8. The current heats the metal oxide film 8 to temperatures above a temperature at which a reduction of the metal oxide occurs to render the film 8 highly reflective, thus preventing further penetration of the laser beam 2 into the optical component 1.

Laterally adjacent the carrier 7 an optical sensor 12 is arranged which detects a pulsed laser beam 2. If the detected laser beam has or exceeds a predetermined energy value (energy density), the optical sensor 12, by means of a control device 13 activates the current source 11 (for example, closes the electric circuit containing tho current source and the metal oxide film) and thus effects the above described temperature increase of the metal oxide film 8.

The control device 13 (which in the simplest case may be a comparator with a threshold transmitter) is, for example, by an appropriate selection of the threshold value, programmed in such a manner that a heating of the metal oxide film to the reduction temperature is obtained before reaching the full laser power (that in, in the region of the increasing flank of the incoming lamer pulse).

It will be understood that the above description of the present invention is susceptible to various modifications, change and adaptations, and the same are intended to be comprehended within the meaning and range of equivalents of the appended claims.

What is claimed is:

1. A device for protecting an optical component from a laser beam, comprising
    (a) a carrier being light-pervious in a predetermined spectral range; said carrier being positionable in an expected path of a laser beam directed to the optical component; and
    (b) a metal oxide film applied to said carrier; said film being light-pervious in said spectral range and being oriented so as to intercept a laser beam directed to the optical component; the metal oxide of said metal oxide film being so selected that said metal oxide is reduced to metal upon being heated to a predetermined temperature by the laser beam.

2. The device as defined in claim 1, wherein said carrier comprises a material selected from the group consisting of ZnS, ZnSe, KRS-5 and diamond.

3. The device as defined in claim 1, wherein said metal oxide film is composed of an oxide of a noble metal.

4. The device as defined in claim 3, wherein said noble metal is gold.

5. The device as defined in claim 3, wherein said noble metal to platinum.

6. The device as defined in claim 1, wherein said metal oxide film is composed of an oxide of a noble metal alloy.

7. The device as defined in claim 1, wherein said carrier is replaceable.

8. An optical arrangement comprising
    (a) an optical component; and
    (b) a device for protecting said optical component from a laser beam; said device including
        (1) a carrier having opposite first and second faces and being light-pervious in a predetermined spectral range; said carrier being positioned adjacent said optical component in an expected path of a laser beam directed to said optical component; said first face being oriented toward said optical component; and
        (2) a metal oxide film applied to said first face of said carrier; said film being light-pervious in said spectral range and being oriented so as to intercept a laser beam directed to said optical component; the metal oxide of said metal oxide film being so selected that said metal oxide is reduced to metal upon being heated to a predetermined temperature by the laser beam.

9. The device as defined in claim 8, wherein said carrier is replaceable.

10. A device for protecting an optical component from a laser beam, comprising
    (a) a carrier being light-pervious in a predetermined spectral range; said carrier being positionable in an expected path of a laser beam directed to the optical component;
    (b) a metal oxide film applied to said carrier; said film being light-pervious in said spectral range and being oriented so as to intercept a laser beam directed to the optical component; and
    (c) an electric circuit for passing an electric current through said metal oxide film; said electric circuit including
        (1) electrodes attached to edge regions of said metal oxide film;
        (2) a current source;
        (3) a control device having first and second states for preventing and, respectively, allowing current flow through said metal oxide film; and
        (4) a sensor exposed to a laser beam directed to said metal oxide film; said sensor being connected to said control device for placing said control device into said second state when said sensor senses a laser beam exceeding a predetermined energy density.

* * * * *